(12) United States Patent
Hahn et al.

(10) Patent No.: US 8,440,750 B2
(45) Date of Patent: *May 14, 2013

(54) SPECIALIZED SILICA, RUBBER COMPOSITION CONTAINING SPECIALIZED SILICA AND PRODUCTS WITH COMPONENT THEREOF

(75) Inventors: Bruce Raymond Hahn, Hudson, OH (US); Edward Lee Johnson, Deer Park, WA (US); Abdulkareem Modupe Melaiye, Akron, OH (US); Bing Jiang, Copley, OH (US); Robert Alan Kinsey, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/944,794

(22) Filed: Nov. 12, 2010

(65) Prior Publication Data

US 2011/0060083 A1 Mar. 10, 2011

Related U.S. Application Data

(63) Continuation-in-part of application No. 12/780,973, filed on May 17, 2010, now Pat. No. 8,003,724.

(60) Provisional application No. 61/223,434, filed on Jul. 7, 2009.

(51) Int. Cl.
*C08K 5/5419* (2006.01)
*C07F 7/12* (2006.01)

(52) U.S. Cl.
USPC ........... 524/269; 524/572; 524/264; 524/609; 556/453; 556/463; 556/487; 556/455

(58) Field of Classification Search .......... 524/269, 524/572, 264, 609; 556/453, 463, 487, 455
See application file for complete search history.

(56) References Cited

U.S. PATENT DOCUMENTS

| | | | |
|---|---|---|---|
| 4,436,847 A | 3/1984 | Wagner | 523/203 |
| 5,708,069 A | 1/1998 | Burns et al. | 524/403 |
| 5,723,529 A | 3/1998 | Bernard | 524/492 |
| 5,789,514 A | 8/1998 | burns et al. | 528/12 |
| 6,013,234 A | 1/2000 | Ray et al. | 523/335 |
| 6,068,694 A | 5/2000 | Bernard et al. | 106/490 |
| 6,517,653 B2 * | 2/2003 | Hahn | 156/123 |
| 6,652,641 B2 | 11/2003 | Kawazura | 106/475 |
| 6,797,762 B2 | 9/2004 | Agostini et al. | 524/493 |
| 6,830,811 B2 | 12/2004 | Chao | 428/405 |
| 7,550,610 B1 | 6/2009 | Chang et al. | 549/533 |
| 7,683,115 B2 * | 3/2010 | Hsu et al. | 524/262 |
| 8,003,724 B2 * | 8/2011 | Hahn et al. | 524/269 |
| 2008/0293871 A1 | 11/2008 | Stenzel et al. | 524/493 |
| 2010/0317793 A1 * | 12/2010 | Sandstrom | 524/571 |

FOREIGN PATENT DOCUMENTS

| | | |
|---|---|---|
| EP | 643015 | 7/1994 |
| EP | 901986 | 8/1998 |
| WO | WO2006/110424 | 10/2006 |

OTHER PUBLICATIONS

European Search Report completed Nov. 11, 2010.

* cited by examiner

*Primary Examiner* — Robert D. Harlan
(74) *Attorney, Agent, or Firm* — Henry C. Young, Jr.

(57) ABSTRACT

The invention relates to allyl functionalized precipitated silica, rubber compositions containing such silica, particularly sulfur cured rubber compositions, and articles of manufacture having a component thereof such as, for example tires. The invention particularly relates to synthetic amorphous silica, particularly a precipitated silica, treated with an allyl silane, particularly to a precipitated silica containing allyl functional groups.

8 Claims, 1 Drawing Sheet

US 8,440,750 B2

SPECIALIZED SILICA, RUBBER COMPOSITION CONTAINING SPECIALIZED SILICA AND PRODUCTS WITH COMPONENT THEREOF

This application is a continuation-in-part of prior U.S. patent application Ser. No. 12/780,973, filed May 17, 2010, which claims the benefit of prior U.S. Provisional Application Ser. No. 61/223,434, filed on Jul. 7, 2009.

FIELD OF THE INVENTION

The invention relates to allyl functionalized precipitated silica, rubber compositions containing such silica, particularly sulfur cured rubber compositions, and articles of manufacture having a component thereof such as, for example tires. The invention particularly relates to synthetic amorphous silica, particularly a precipitated silica, treated with an allyl silane, particularly to a precipitated silica containing allyl functional groups.

BACKGROUND OF THE INVENTION

Rubber compositions are often reinforced with reinforcing fillers such as at least one of rubber reinforcing carbon black and synthetic amorphous silica (e.g. precipitated silica).

Various products contain at least one component comprised of such rubber compositions such as, for example, tires.

In order to enhance rubber reinforcing effects of precipitated silica, a coupling agent is typically used in combination with the precipitated silica.

Such coupling agent typically contains a moiety (e.g. alkoxysilane group) reactive with hydroxyl groups (e.g. silanol groups) on the precipitated silica and another different moiety (e.g. polysulfide as a sulfur contributing moiety) interactive with elastomers containing carbon-to-carbon double bonds (e.g. diene-based elastomers).

A typical disadvantage of such polysulfide moiety of the silica coupling agent is its sulfur contribution at an elevated temperature of the uncured rubber composition, such as for example during physical mixing of the uncured rubber composition, which interacts with carbon-to-carbon double bonds of an elastomer in the rubber composition to promote a significantly increased viscosity of the rubber composition which leads to increased rubber processing difficulties, or challenges. Such phenomenon is well known to those having skill in such art.

For this invention, a rubber reinforcing precipitated silica is used which may usually be characterized by having typical properties for a synthetic precipitated silica used for reinforcing rubber compositions such as a BET nitrogen surface area in a range of from 120 to 300 m$^2$/g; a CTAB surface area in a range of from 100 to 300 m$^2$/g, with a ratio of the BET/CTAB surface areas in a range of from 0.8 to 1.3.

The BET nitrogen surface may be determined according to ASTM D1993, or equivalent, and the CTAB surface area according to DIN53535.

A significance of providing the precipitated silica with the required BET/CTAB ratio for rubber reinforcement purposes is exemplified in patent literature as a value in a range of, for example, from 0.8 to 1.3 with a BET surface area of, for example 120 to 300 m$^2$/g and a CTAB surface of, for example, 100 to 300 m$^2$/g. For example, see U.S. patent application Ser. No. 2008/0293871, U.S. Pat. No. 6,013,234 and EP Patent Publication No. 0901986.

The DBP absorption value, or number, may be determined according to DIN 53601 or equivalent.

In one embodiment, such precipitated silica might be typified, for example, by mercury porosimetric parameters of, for example and as measured by a CARLO-ERBA Porosimeter 2000 or equivalent as a surface area in a range of from 100 to 240 m$^2$/g, and pore size distribution maximum in a range of from 20 to 75 nm (nanometers).

For this invention, it has been discovered that an allyl functionalized rubber reinforcing precipitated silica may be used as silica reinforcement for a rubber composition. Such allyl functionalized silica does not contain a polysulfidic moiety so that sulfur is not available to prematurely interact with the elastomer(s) in the rubber composition. Where the allyl functionalized precipitated silica is formed, for example, by treatment of a precipitated silica with an allyltrialkoxysilane or allylhalosilane, it is envisioned that an alkoxysilane moiety of the allylalkoxysilane or halogen moiety of the allylhalosilane reacts, for example, with hydroxyl groups (e.g. silanol groups) and/or hydrogen groups on the precipitated silica. The treated silica thereby contains allyl hydrocarbon groups which can be interactive with, and thereby couple the silica with diene-based elastomer (elastomer formed by polymerization of monomers containing diene hydrocarbons) in the presence of sulfur curative during the subsequent vulcanization of the rubber composition.

It is further envisioned that, if desired, a beneficially relatively high temperature mixing of the allyl functionalized silica with the elastomer(s) can occur without an attendant sulfur-promoted viscosity increase of the rubber mixture prior to addition of the sulfur and sulfur cure accelerators to the rubber mixture. It is envisioned that such higher temperature mixing of the rubber composition provides an opportunity for more efficient mixing of the rubber composition for a shorter mixing time.

Further, it is envisioned that the presence of allyl functional groups on the silica (e.g. precipitated silica) surface provide a degree of hydrophobicity to the silica surface to thereby enhance, or improve, its dispersion within the rubber mixture with a consequent enhancement, or improvement, in its reinforcement of the rubber composition.

Representative examples of various allyl silanes for preparation of allyl functionalized silica are, for example, allyltriethoxysilane, allyltrimethoxysilane, allyldimethylchlorosilane, allyltrichlorosilane, allylmethyldichlorosilane, diallylchloromethylsilane, diallyldichlorosilane and triallylchlorosilane.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention an allyl silane treated (modified) synthetic amorphous silica (precipitated silica) is provided which may be referred to herein as an allyl functionalized precipitated silica.

Such allyl functional precipitated silica is provided by treating synthetic amorphous silica (precipitated silica) with at least one allyl silane.

For this invention, an allyl functional precipitated silica is provided which is comprised of a precipitated silica containing at least one allyl group substituent;

wherein said precipitated silica has:
(A) a BET nitrogen surface area in a range of from 120 to 300 m²/g,
(B) a CTAB surface area in a range of from 100 to 300 m²/g, with
(C) a ratio of said BET/CTAB surface areas in a range of from 0.8 to 1.3;
wherein said allyl functionalized precipitated silica is represented by a general formula (I):

(I)

where Z represents the precipitated silica; $R^2$ and $R^3$ are the same or different radicals comprised of an alkyl group containing from 1 to 4 carbon atoms, a cycloalkyl group, a phenyl group, and alkene group containing from 3 to 18 carbon atoms or cycloalkene radical having from 5 to 8 carbon atoms; and $R^1$ is an allyl hydrogen containing hydrocarbon radical. where a is an integer in a range of from 0 to 2, b is an integer in a range of from 0 to 2 and c is an integer in a range of from 1 to 3.

In further accordance with this invention, at least one of $R^2$ and $R^3$ may be comprised of at least one of hydroxyl groups and siloxy groups.

For this invention, because the Si moiety has a valence of 4, it is considered that the number of Z—O— units inherently ranges from 1 to 3, depending upon the values of a, b and c. For example, if c equals 1 and both a and b equal 0, than Z—O— is necessarily comprised of 3 units.

Desirably, said allyl containing hydrocarbon radical is comprised of at least one of:
—CH₂—CH═CH₂, (allyl hydrocarbon radical)
—CH₂—CH═CH—CH₃, (2-butene radical)
—CH₂—CH═C—(CH₃)₂ and (dimethallyl hydrocarbon radical)
—CH₂—C(CH₃)═CH—CH₃ (2-methyl-2-butene radical)

In one embodiment, the said precipitated silica might have, for example, mercury porosimetric parameters of:
(A) surface area in a range of from 100 to 240 m2/g, and
(B) pore size distribution maximum in a range of from 20 to 75 nm.

In practice, said allyl functionalized precipitated silica may be in a form of aggregates of coalesced primary particles thereof with an average aggregate size, for example, in a range of from about 0.8 to about 1.2 microns.

In further accordance with this invention, said allyl silane has a general formula (II):

(II)

where $R^2$ and $R^3$ are the same or different and comprised of an alkoxy group containing from 1 to 8 carbon atoms, a cycloalkoxy group containing from 5 to 8 carbon atoms, an alkyl group containing from 1 to 4 carbon atoms, a cyclohexyl group, a phenyl group, an alkene containing from 3 to 18 carbon atoms, or a cycloalkene containing 5 to 8 carbon atoms;
where X is a chlorine, a hydroxy, or a hydrogen;
where $R^1$ is an allyl hydrogen containing hydrocarbon radical. Desirably said allyl hydrogen containing hydrocarbon radical is comprised of at least one of:
—CH₂—CH═CH₂, (allyl hydrocarbon radical)
—CH₂—CH═CH—CH₃, (2-butene radical)
—CH₂—CH═C—(CH₃)₂ and (dimethylallyl hydrocarbon radical)
—CH₂—C(CH₃)═CH—CH₃ (2-methyl-2-butene radical)
where a is an integer with a range of from 0 to 3, b is an integer in a range of from 0 to 3, c is an integer in a range of from 1 to 3, and d is an integer in a range of from 0 to 3 and the sum of a, b, c and d is 4;
wherein at least one of X, $R^2$ and $R^3$ is present;
wherein if d=0, at least one of $R^2$ and $R^3$ is an alkoxy group.

It is envisioned that, for the allyl functionalized precipitated silica, $R^2$ and $R^3$ of said allyl silane are the same or different and may be selected from at least one of:
(A) alkoxy group comprised of ethoxy or methoxy groups,
(B) cycloalkoxy group,
(C) alkyl group comprised of methyl, ethyl or propyl groups,
(D) cycloalkyl group,
(E) phenyl group, and
(F) allyl hydrogen-containing alkene group. Such alkene group is desirably comprised of allyl, 2-butene dimethylallyl or 2-methyl-2-butane radical.

Representative examples of said allyl functionalized silane for functionalizing the precipitated silica are, for example, allylalkoxysilanes comprised of at least one of allyltriethoxysilane, allyltrimethoxysilane, and allylhalosilanes comprised of at least one of allyldimethylchlorosilane, allyltrichlorosilane, allylmethyldichlorosilane, diallylchloromethylsilane, and diallyldichlorosilane. A desirable allyl functionalized silane is allyltrichlorosilane.

In further accordance with this invention, a rubber composition is provided which contains reinforcing filler comprised of said allyl functionalized precipitated silica and which may further contain at least one of rubber reinforcing carbon black and an additional precipitated silica which does not contain allyl functionalization. Such rubber composition may further contain at least one silica coupling agent to aid in coupling said precipitated silica(s) to elastomers contained in said rubber composition. In practice, said coupling agent has a moiety reactive with hydroxyl groups on said silica (e.g. silanol groups) and another different moiety interactive with elastomers contained in said rubber composition.

For example, a rubber composition is provided which is comprised of, based upon parts by weight per 100 parts by weight rubber (phr):
(A) 100 phr of at least one conjugated diene based elastomer;
(B) about 10 to about 120, alternately about 40 to about 100, phr of reinforcing filler wherein said reinforcing filler is comprised of:
(1) about 40 to about 100, alternately about 50 to about 80, phr of allyl functionalized precipitated silica (allyl silane treated precipitated silica);
(2) zero to about 60, alternately about 3 to about 30, phr of rubber reinforcing carbon black, and
(3) optionally up to about 70 phr of precipitated silica (other than the allyl functionalized precipitated silica).

While various methods for producing an allyl silane functionalized precipitated silica during the manufacture of the precipitated silica may be contemplated, one method envisioned relates to the preparation of precipitated silica for rubber reinforcement purposes based upon methods described in U.S. Pat. No. 5,723,529 which may comprise:

(A) reacting at least two inorganic materials, in the presence of water, with a strong base to form a aqueous solution of a product thereof;
wherein said inorganic materials are comprised of, based on 100 parts by weight thereof,
(1) from 60 to 99.9 parts silicon dioxide, and
(2) from 0.1 to 40 parts of at least one additional inorganic material capable of forming said aqueous solution, said inorganic material being selected from at least one of:
(a) oxides of aluminum, iron, magnesium, boron, titanium, zirconium, zinc, vanadium and niobium,
(b) salts of aluminum, iron, magnesium, boron, titanium, zirconium, zinc, vanadium and niobium as phosphates, sulfates and halogenides thereof, and
(c) natural and synthetic aluminum silicates;
(B) treating said aqueous solution by the addition of a mineral acid to react with the said product and form a reaction product thereof and to reduce the pH of the solution to thereby produce precipitated particles of the reaction product as a precipitate;
(C) optionally interrupting the said acid addition of step (B) to said aqueous solution to allow the said precipitate to age for a period of time before resuming the addition of acid, followed by adding additional acid until a desired pH is reached to complete the said reaction and precipitation of the reaction product;
(D) optionally, after said acid addition of step (B) and/or step (C) if used, is completed, allowing the precipitate to age for a period of time;
(E) filtering and washing the precipitate with water and drying the precipitate to recover particles in a form of an aggregate thereof,
(F) addition of at least one electrolyte having an anion in any of steps (B), (C) and (D) selected from at least one of carbonate, silicate, aluminate, borate, alumino-silicate, phosphate, sulfate, halogenide, titanate and zirconate and cation selected from at least one of lithium, sodium, potassium, magnesium and/or calcium;
(G) treating the said precipitate with at least one ionic and/or non-ionic surfactant, and
(F) addition of at least one of said (hereinbefore described) allyl silanes in or after any of steps (C), (B), (D) and (E). Desirably, therefore, said allyl silane is comprised of at least one of:
$CH_2—CH=CH_2$, (allyl hydrocarbon)
$CH_2—CH=CH—CH_3$, (2-butene)
$CH_2—CH=C—(CH_3)_2$ and (dimethylallyl hydrocarbon)
$CH_2—C(CH_3)=CH—CH_3$ (2-methyl-2-butene)

In practice, said allyl functionalized precipitated silica may be formed by pre-treating the precipitated silica with said allyl silane prior to its addition to the rubber composition or may be treated in situ within the rubber composition by addition of said precipitated silica and said allyl silane individually to the rubber composition.

In further accordance with this invention, an article of manufacture, such as for example a tire, is provided having at least one component comprised of said rubber composition. Such tire component may be, for example, at least one of a tire sidewall, tire sidewall insert, tire sidewall apex, ply coat, wire coat, and tread.

From a historical perspective, according to U.S. Pat. Nos. 5,708,069, 7,550,610 and 5,789,514, silica gels may be derived, for example, by hydrophobating a silica hydrogel with, for example, an organomercaptosilane and alkyl silane and drying the product. The resulting hydrophobated silica gel may be blended with natural rubber and/or synthetic rubber.

A general description of silica gel and precipitated silica may be found, for example, in the *Encyclopedia of Chemical Technology*, Fourth Edition (1997), Volume 21, Kirk-Othmer in Pages 1020 through 1023.

While silica gels are a form of precipitated silica, this invention is intended to be a significant departure therefrom in a sense of having the aforesaid required BET and CTAB surfaces area characterization in combination with the required narrow ratio thereof in a range of from 0.8 to 1.3 instead of significantly different precipitated silicas such as presented in Patent Publication EP 0643015 and mentioned in U.S. Patent Application Publication No. 2008/0293871 as indicated as being useful as an abrasive and/or thickening component in toothpaste (rather than for suitable rubber reinforcement) with a BET surface area of 10 to 130 $m^2/g$ and CTAB surface area of 10 to 70 $m^2/g$ combined with a BET to CTAB surface area ratio of approximately 1 to 5.2.

Rubber compositions are often prepared by mixing a diene-based rubber, carbon blacks and other rubber compounding ingredients, exclusive of sulfur based rubber curatives, in at least one sequential mixing step with at least one mechanical mixer, usually referred to as "non-productive" mix step, or stage(s), to a an elevated temperature under high shear rubber mixing conditions followed by a final mix step, or stage, in which sulfur based curative(s), such as sulfur and sulfur cure accelerators, are added and mixed therewith at a lower mixing temperature to avoid unnecessarily pre-curing the rubber mixture during the mixing stage. The terms "non-productive" and "productive" mix stages are well known to those having skill in the rubber mixing art.

It is to be appreciated that the rubber composition is conventionally cooled to a temperature below about 40° C. between the aforesaid mix stages.

The sulfur vulcanizable elastomers may be comprised of, for example, at least one of polymers of at least one of isoprene and 1,3-butadiene and copolymers of styrene with at least one of isoprene and 1,3-butadiene.

If desired, at least one of the sulfur vulcanizable elastomers may be comprised of:

(A) a coupled elastomer comprised of a polymer of at least one of isoprene and 1,3-butadiene and copolymer of styrene with at least one of isoprene and 1,3-butadiene,
wherein said coupled elastomer is at least one of tin and silica coupled elastomer, or
(B) functionalized elastomer of at least one of styrene/butadiene copolymer elastomer (SBR), cis 1,4-polybutadiene elastomer and cis 1,4-polyisoprene elastomer;
wherein said functionalized elastomer contains functional group(s) comprised of:
(1) amine functional group reactive with said allyl functionalized precipitated silica, or
(2) siloxy functional group reactive with said allyl functionalized precipitated silica filler rubber reinforcement, or
(3) combination of amine and siloxy functional groups reactive with said allyl functionalized silica, or
(4) silane/thiol functional group reactive with said allyl functionalized silica, or
(5) hydroxyl functional groups reactive with said allyl functionalized precipitated silica, or (6) epoxy groups reactive with said allyl functionalized precipitated silica, or (7) carboxyl groups reactive with said allyl functionalized precipitated silica.

The following examples are provided to further illustrate the invention in which the amounts and percentages of materials are by weight unless otherwise indicated.

EXAMPLE I

Preparation of Allyl Functionalized Precipitated Silica

Precipitated silica (agglomerated synthetic amorphous silica aggregates) was obtained as Zeosil™ 1165 MP (Micropearl), a product of Rhodia.

The precipitated silica in its agglomerate form was placed in a high speed blender for 3 minutes to break it (somewhat de-agglomerate it) into a less dense form of precipitated silica aggregates.

The broken up (de-agglomerated) silica aggregates are referred to herein as Silica A.

(A) Treatment with Allyltrichlorosilane

Thirty grams of the precipitated silica aggregates was placed into a round bottomed flask equipped with a Dean-Stark Trap together with dry toluene.

The silica/toluene suspension was heated and refluxed in the flask and a water/toluene mixture containing about 1.65 ml of water was collected (removed from the refluxing suspension) by azeotropic distillation. The water/mixture collected (removed) contained about 5.5 percent by weight of the original silica.

To the remaining silica/toluene mixture was added 2.6 gm of allyltrichlorosilane dropwise to the refluxing suspension in the flask. As the allyltrichlorosilane was added, the suspension became less viscous and more transparent which indicated that a solution was forming. The solution was stirred under reflux conditions for two hours and then cooled and filtered to obtain the treated (allyl functionalized) precipitated silica.

The collected treated (allyl functionalized) precipitated silica is referred to herein as Silica B.

(B) Treatment with Allylchlorodimethylsilane

Thirty grams of the precipitated silica aggregates were similarly processed using 1.19 gm of allylchlorodimethylsilane.

The collected treated (allyl functionalized) precipitated silica is referred to herein as Silica C.

(C) Treatment with Allyltriethoxysilane

Thirty grams of the precipitated silica aggregates were similarly processed using 1.82 gm of allyltriethoxysilane.

The collected treated (allyl functionalized) precipitated silica is referred to herein as Silica D.

(D) Treatment with N-Propyltriethoxysilane (not an Allylalkoxysilane)

Thirty grams of the precipitated silica aggregates were similarly processed using 1.83 gm of N-propyltriethoxysilane.

The collected treated precipitated silica is referred to herein as Silica E.

EXAMPLE II

Evaluation of Pre-treated Precipitated Silicas

The treated samples of precipitated silica of Example I were evaluated in a rubber composition. The following Table A represents the general rubber formulation. The parts and percentages are by weight unless otherwise indicated.

TABLE A

| | Parts |
|---|---|
| Non-Productive Mix Stage (NP) | |
| Natural cis 1,4-polyisoprene rubber[1] | 100 |
| Fatty acid[2] | 1 |
| Coupling agent[3] | 0 and 4 |
| Carbon black[4] | 4 |
| Precipitated silicas[5] | 50 |
| Productive Mix Stage (PR) | |
| Sulfur | 1.5 |
| Sulfenamide sulfur cure accelerator | 2 |
| Zinc oxide | 1.5 |
| Antioxidant, amine based | 0.5 |

[1]Natural rubber, SMR20

[2]Mixture comprised of stearic, palmitic and oleic acids

[3]Coupling agent comprised of bis(3-triethoxypropyl) tetrasulfide having an average of from about 3.2 to about 3.8 connecting sulfur atoms in its polysulfidic bridge from Evonic Degussa as Si69 ™.

[4]Rubber reinforcing HAF (high abrasion furnace) carbon black as N330, an ASTM designation.

[5]Precipiated silicas from Example I as:

Silica A, de-agglomerated untreated aggregates of precipitated silica as Zeosil™ 1165 MP having a BET nitrogen surface area of about 165 m²/g; a CTAB surface area of about 160 m²/g and therefore with a BET/CTAB ratio of about 1.03.

Silica B, an allyltrichlorosilane treated precipitated silica

Silica C, an allylchlorodimethylsilane treated precipitated silica

Silica D, an allyltriethoxysilane treated precipitated silica

Silica E, an N-propyltriethyxysilane treated precipitated silica

Samples of the rubber compositions were prepared by blending the ingredients in an internal rubber mixer using two separate, sequential, mixing stages, or steps, namely a first non-productive mixing stage (NP) to a relatively high temperature followed by a second, productive mixing stage (PR) to a significantly lower mixing temperature in which the sulfur, sulfur cure accelerator and zinc oxide were added. Such rubber mixing procedure is well known to those having skill in such art.

For the non-productive mixing stage (NP), the ingredients are mixed for about 4 minutes to an autogeneously generated, via the high shear mixing in the internal rubber mixer, drop temperature of about 150° C. at which time the batch is "dropped", or removed, from the associated internal rubber mixer. The batch is sheeted out and allowed to cool to a temperature below 40° C. The batch is then mixed in a productive mixing stage (PR) during which free sulfur, vulcanization accelerator and zinc oxide are added and mixed for a period of about 2 minutes to a drop temperature of about 110° C. The cure behavior and various cured physical properties of the respective Samples are shown in the following Table 1. For the cured rubber Samples, the Samples were individually cured for about 30 minutes at a temperature of about 150° C.

The rubber samples are identified as Control rubber Sample A and Experimental rubber Samples B, C, D and E.

TABLE 1

| | Control Sample | Experimental Samples | | | |
|---|---|---|---|---|---|
| | A | B | C | D | E |
| Materials (phr) | | | | | |
| Coupling agent | 4 | 0 | 0 | 0 | 0 |
| Silica A - untreated precipitated silica | 50 | 0 | 0 | 0 | 0 |
| Silica B - allyltrichlorosilane treated silica | 0 | 50 | 0 | 0 | 0 |
| Silica C - allylchlorodimethylsilane treated silica | 0 | 0 | 50 | 0 | 0 |
| Silica D - allyltriethoxysilane treated silica | 0 | 0 | 0 | 50 | 0 |
| Silica E - N-propyltriethoxysilane treated silica | 0 | 0 | 0 | 0 | 50 |
| Test Properties MDR[1], 150° C., 60 minutes | | | | | |
| Maximum torque − Minimum torque (dNm) | 17.2 | 16.1 | 20.2 | 17.7 | 19.7 |
| ATS[2], stress-strain (cured 30 min. at 150° C.) | | | | | |
| 100% ring modulus (MPa) | 1.9 | 1.1 | 1.4 | 1.2 | 1.1 |
| 300% ring modulus (MPa) | 9.2 | 4.7 | 6 | 5.1 | 4.3 |
| Tensile strength (break strength), (MPa) | 23.9 | 11.1 | 17.5 | 34.2 | 18.3 |
| Elongation at break (%) | 561 | 494 | 546 | 678 | 648 |
| Energy to achieve a 300% strain (Joules) | 4.1 | 2.4 | 3 | 2.4 | 2.1 |
| RPA[3] (150° C. cure cycle, 11 Hz, 10% strain, 100° C.) | | | | | |
| Storage modulus (G'), (MPa) | 1693 | 1352 | 1747 | 1889 | 1684 |
| Tan delta | 0.11 | 0.22 | 0.16 | 0.16 | 0.17 |

[1]Rheometer (MDR) instrument
[2]Automated Testing System (ATS) instrument
[3]Rubber Process Analyzer (RPA) instrument It can be seen from Table 1 that both the 100 percent and 300 percent modulus values were higher for rubber Samples B, C and D using the allyl silane treated (allyl functionalized) Silicas B, C and D, respectively, as compared to Experimental rubber Sample E which used the propylsilane treated Silica E.

The energy to achieve a 300 percent strain is also seen to be higher for the rubber Samples B, C and D using the allyl silane treated (allyl functionalized) silicas as compared to rubber Sample E which used the propyltriethoxysilane (non allyl-containing silane) treated Silica E. The energy to achieve a 300 percent strain is considered to be a measure of the polymer crosslinking, entanglements and polymer/filler interaction. Since the cure system and rubber (natural rubber) are the same for the rubber Samples, then an increase in the energy to achieve a 300 percent strain is an indication of increased polymer/filler interaction for the allyl silane treated (allyl functionalized) precipitated silicas.

The MDR difference between maximum torque and minimum torque is seen to be lower for the rubber Samples B and D containing the respective allyl silane treated (allyl functionalized) precipitated Silica B and Silica D, respectively, as compared to rubber Sample F containing the propylalkoxysilane treated Silica F.

The MDR difference between maximum torque and minimum torque is seen to be slightly higher for the rubber Sample C containing the respective allyl silane treated (allyl functionalized) precipitated Silica C, as compared to rubber Sample F containing the propylalkoxysilane treated Silica F.

It is considered that the higher modulus values taken together with lower or substantially equivalent maximum and minimum torque differences is further indicative of an increased amount of rubber/filler interaction for the rubber Samples B, C, and D containing the allyl silane treated (allyl functionalized) precipitated silicas as compared to rubber Sample F containing the propylalkoxyslane treated Silica F.

It is concluded herein that the allyl groups on the allyl silane treated (allyl functionalized) precipitated silicas are participating in the sulfur vulcanization process in a manner of creating a coupling bond from the precipitated silica to the rubber.

EXAMPLE III

Evaluation of In Situ Treated Precipitated Silica

Precipitated silica (agglomerated synthetic amorphous silica aggregates) was obtained as Zeosil™ 1165 MP (Micropearl), a product of Rhodia.

Rubber samples were prepared by blending an allylalkoxysilane and a propylalkoxysilane (not an allyl silane), separately and individually, with the precipitated silica-containing rubber composition.

In this manner, then, the precipitated silica is treated with the allylalkoxysilane or propylalkoxysilane in situ in the rubber composition in an internal rubber mixer.

The rubber samples are referred to herein as rubber Sample X and rubber Sample Y.

For rubber Sample X, the allylalkoxysilane was allyltriethoxysilane.

For rubber Sample Y, the propylsilane was N-propyltriethoxysilane.

Samples of the rubber compositions were prepared in the manner of Example I except for addition of the precipitated silica, and allylalkoxysilane or propylalkoxysilane separately.

The following Table B represents the general rubber formulation. The parts and percentages are by weight unless otherwise indicated.

TABLE B

|  | Parts |
|---|---|
| Non-Productive Mix Stage (NP) | |
| Natural cis 1,4-polyisoprene rubber[1] | 100 |
| Fatty acid[2] | 1 |
| Coupling agent[3] | 0 |
| Carbon black[4] | 4 |
| Precipitated silica[6] | 50 |
| Allyltriethoxysilane | 3.4 |
| N-propyltriethoxysilane | 3.5 |
| Productive Mix Stage (PR) | |
| Sulfur | 1.5 |
| Sulfenamide sulfur cure accelerator | 2 |
| Zinc oxide | 1.5 |
| Antioxidant, amine based | 0.5 |

[6]Precipitated silica as Zeosil™ 1165 MP from Rhodia

The ingredients were those used in Table A of Example II except for the precipitated silica in its agglomerated form The cure behavior and various cured physical properties of the respective Samples are shown in the following Table 3. For the cured rubber Samples, the Samples were individually cured for about 30 minutes at a temperature of about 150° C.

TABLE 2

|  | Experimental Rubber Samples | |
|---|---|---|
|  | F | G |
| Materials | | |
| Allyltriethoxysilane in situ treated precipitated silica | 3.4 | 0 |
| N-propylalkoxysilane in situ treated precipitated silica | 0 | 3.5 |
| Test Properties | | |
| MDR, 150° C., 60 minutes | | |
| Maximum torque-Minimum torque (dNm) | 17.6 | 17.9 |
| Stress-strain (cured 30 min. at 150° C.) | | |
| 100% modulus (MPa) | 1.5 | 1.2 |
| 300% modulus (MPa) | 6.9 | 5.2 |
| Tensile strength (MPa) | 19.8 | 23.2 |
| Elongation at break (%) | 575 | 677 |
| Energy to achieve a 300% strain (Joules) | 3.3 | 2.3 |
| RPA (150° C. cure cycle, 11 Hz, 10% strain, 100° C.) | | |
| Storage modulus (G') | 1545 | 1541 |
| Tan delta | 0.15 | 0.17 |

It can be seen from Table 2 that both the 100 percent and 300 percent modulus values were higher for rubber Sample F using the allyalkoxysilane in situ treated silica as compared to rubber Sample G which used the propylalkoxysilane in situ treated silica.

The Energy to achieve a 300 percent strain is seen to be higher for the rubber Sample F using the allyalkoxysilane in situ treated silica as compared to rubber Sample G which used the propylsilane in situ treated silica and the difference between MDR maximum and minimum torque values are substantially equivalent. The higher energy to achieve a 300 percent strain together with the substantially equivalent difference between maximum and minimum torque values is indicative of improved rubber/filler interaction for Sample F as compared to rubber Sample G in which the propylalkoxysilane was used to treat the precipitated silica in situ.

The tan delta value is lower for the rubber Sample F in which the silica was treated in situ with the allylalkoxysilane as compared to the rubber Sample G in which the silica was treated in situ with the propylalkoxysilane. This is indicative of improved rubber/filler interaction for the rubber Sample F which is, in turn, indicative of lower internal heat build up for the Sample F rubber composition and beneficially lower rolling resistance for a vehicular tire having a tread of such rubber composition.

It is concluded herein that the allyl groups on the allylalkoxysilane in situ treated precipitated silica are participating in the sulfur vulcanization process in a manner of creating a coupling bond to the rubber.

EXAMPLE IV

Additional treated precipitated silicas were prepared in the manner of Example I and identified herein as Silica X and Silica Y.

Silica X contained 3 percent allyl groups in its surface prepared by treating the precipitated silica with allyltriethoxysilane.

Silica Y contained 3 percent propyl groups on its surface prepared by treating the precipitated silica with propyltriethoxysilane.

Rubber compositions were individually prepared with Silica X and Silica Y, respectively, as well as the untreated silica identified herein as Silica Z.

Silica Z is a precipitated silica comprised of bis(3-triethoxysilylpropyl) polysulfide having an average in a range of from about 3.4 to about 3.8 connecting sulfur atoms in its polysulfidic bridge as Si69™ from Evonic Degussa.

The following Table C represents the general rubber formulation. The parts and percentages are by weight unless otherwise indicated.

TABLE B

|  | Parts |
|---|---|
| Non-Productive Mix Stage (NP) | |
| Cis 1,4-polybutadiene rubber[7] | 0 and 25 |
| Solution polymerization prepared styrene/butadiene rubber (S-SBR)[8] | 0 and 75 |
| Natural cis 1,4-polyisoprene rubber[1] | 0 and 100 |
| Naphthenic rubber processing oil | 20 |
| Wax (microcrystalline) | 1 |
| Fatty acid[2] | 2 |
| Coupling agent[3] | 0 and 5.2 |
| Carbon black[4] | 5.2 |
| Silica Z (untreated precipitated silica)[6] | 0 and 65 |
| Silica X (Allyltriethoxysilane treated precipitated silica) | 0 and 69 |
| Silica Y (N-propyltriethoxysilane treated precipitated silica) | 0 and 69 |
| Productive Mix Stage (PR) | |
| Sulfur | 1.5 |
| Sulfenamide sulfur cure accelerator | 1.5 |
| Zinc oxide | 1 |
| Antioxidant, amine based | 0.5 |
| Diphenylguanidine secondary sulfur cure accelerator | 2 |

[7]Cis 1,4-polybutadiene rubber as Budene™ 1207 from The Goodyear Tire & Rubber Company
[8]Solution polymerization prepared SBR as Solflex™ 33H23 from The Goodyear Tire & Rubber Company Rubber Samples H through M were prepared in the manner of Example I.

The cure behavior and various cured physical properties of the respective Samples are shown in the following Table 3. For the cured rubber Samples, the Samples were individually cured for about 30 minutes at a temperature of about 150° C.

The rubber samples are identified as Control S-SBR rubber Sample H and Experimental S-SBR rubber Samples I and J. The Control Natural Rubber is Sample K and the Experimental Natural rubber Samples L and M.

TABLE 3

|  | Control Sample | Experimental Samples | | | | |
| --- | --- | --- | --- | --- | --- | --- |
|  | H | I | J | K | L | M |
| Materials (phr) | | | | | | |
| Cis 1,4-polybutadiene rubber | 25 | 25 | 25 | 0 | 0 | 0 |
| S-SBR | 75 | 75 | 75 | 0 | 0 | 0 |
| Natural rubber | 0 | 0 | 0 | 100 | 100 | 100 |
| Coupling agent | 5.2 | 0 | 0 | 5.2 | 0 | 0 |
| Silica X - allyltrichlorosilane treated silica | 0 | 69 | 0 | 0 | 69 | 0 |
| Silica Y - propylalkoxysilane treated silica | 0 | 0 | 69 | 0 | 0 | 69 |
| Silica Z - untreated precipitated silica | 65 | 0 | 0 | 65 | 0 | 65 |
| Test Properties MDR, 150° C., 60 minutes | | | | | | |
| Maximum torque less Minimum torque (dNm) | 16.2 | 15.8 | 11.6 | 21.9 | 18.1 | 22.72 |
| Scorch time[4] TS1 (minutes) | 0.8 | 5.7 | 7.3 | 0.3 | 0.7 | 2.25 |
| Scorch time[4] TS2 (minutes) | 4 | 6.2 | 7.9 | 0.8 | 7 | 2.97 |
| ATS, stress-strain (cured 30 min. at 150° C. | | | | | | |
| 100% ring modulus (MPa) | 2.7 | 2.6 | 1.2 | 3.2 | 2.7 | 1.33 |
| 300% ring modulus (MPa) | 10.7 | 13.7 | 4.4 | 14 | 11.3 | 4.31 |
| Tensile strength (break strength), (MPa) | 14.8 | 21.6 | 15.5 | 24.5 | 23.4 | 18.59 |
| Elongation at break (%) | 428 | 439 | 581 | 486 | 532 | 612 |
| Energy to achieve a 300% strain (Joules) | 5.4 | 6.2 | 2.1 | 6.8 | 5.7 | 2.31 |
| RPA (150° C. cure cycle, 11 Hz, 10% strain, 100° C.) | | | | | | |
| Storage modulus (G'), (MPa) | 1619 | 1654 | 1208 | 2172 | 1975 | 2171 |
| Tan delta | 0.06 | 0.07 | 0.08 | 0.11 | 0.12 | 0.125 |

[4]Scorch time is the time in minutes to a specified torque rise in the Rheometer. For example, in the Table, TS1 and TS2 are the times for a 1 and 2 point rise, respectively, in the torque.

It can be seen from Table 3 that rubber Sample I containing Silica X (the allyltrialkoxysilane treated precipitated silica) has higher modulus values, higher tensile strength and higher energy (at 300 percent modulus) than rubber Sample J which contained Silica Y (the propylalkoxysilane treated precipitated silica). This is indicative of increased rubber/filler interaction due to the presence of the allyl group(s) on the precipitated silica.

It can also be seen from Table 3 that Sample I has higher modulus values, higher tensile strength and higher energy to achieve 300 percent strain than rubber Sample H. This is considered herein to be surprising since rubber Sample H uses the silica coupler. This is further indicative of increased rubber/filler interaction due to the presence of the allyl group(s) on the precipitated silica.

In Table 3, scorch times TS1 and TS2 are reported for rubber Samples H through M. It can be seen that rubber Samples J and M which contained the propylalkoxysilane treated silica (Silica Y) had the longest scorch times which is an indication of the ability to process the rubber composition without premature curing, or scorching. This is not considered herein to be surprising since the propyl group is not reactive with the elastomer.

It can be seen that rubber Samples I and L which contained the allyl silane treated (allyl functionalized) precipitated silica (Silica X) had the next longest scorch times. This is considered herein to be an advantage since the Silica X has an ability to bond to the elastomer yet have increased processing times (until scorching) as compared to the rubber Samples H and K which used conventional coupling with the inclusion of the coupling agent.

DRAWING

A drawing is provided as FIG. 1 (FIG. 1) in order to further illustrate the invention as presented in this Example IV. The drawing is a graphical plot of time in minutes (x-axis) versus torque at a constant temperature of 150° C. The torque (y-axis) is reported as dNm.

IN THE DRAWING

Figure 1:
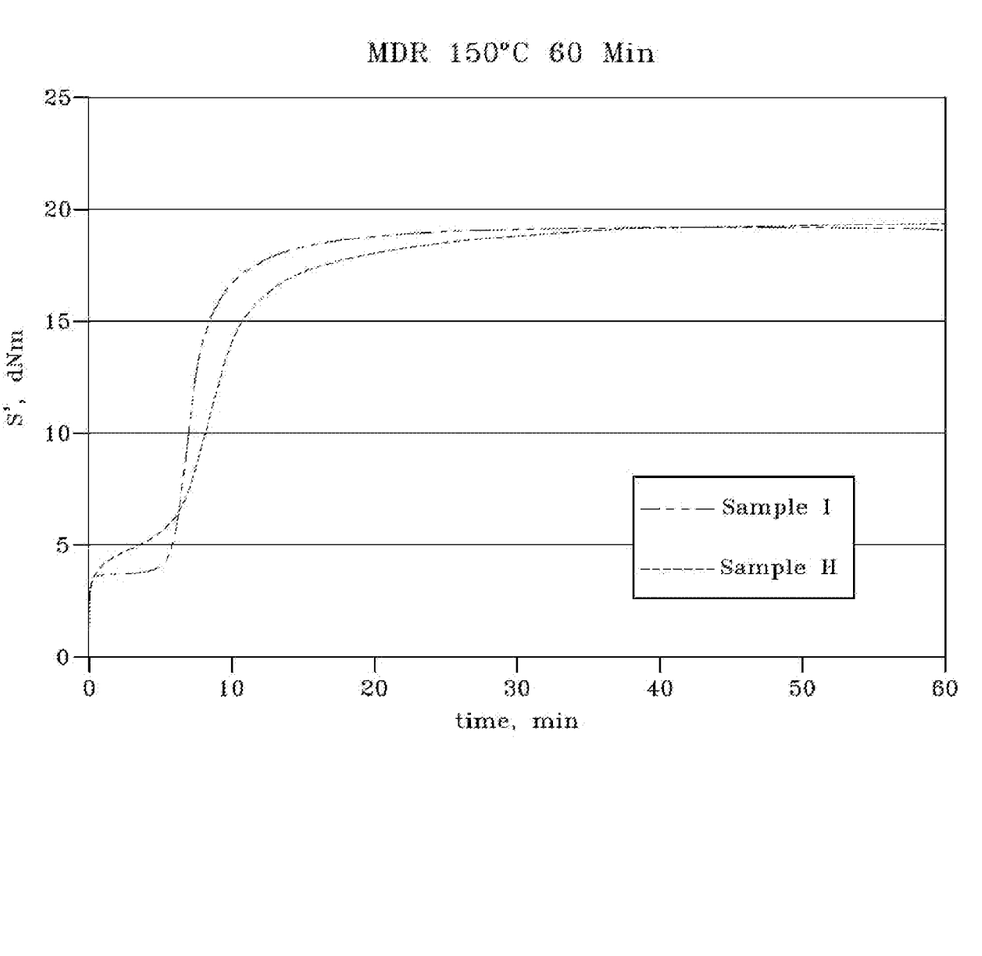

From FIG. 1 it is seen that for Control rubber Sample H using the non-treated silica the torque begins to increase immediately. This phenomenon is an indication of the reaction between the coupling agent which has become bound to the silica and the rubber during the mixing of the rubber composition at an elevated temperature.

This immediate rise in torque is considered herein to be unfavorable for manufacturing plant rubber processing because it is indicative of a rapid increase in Mooney viscosity of the rubber composition. The increase in rubber viscosity is generally unfavorable for processing of the rubber composition during its mixing in an internal rubber mixer as well as its subsequent processing such as by shaping (e.g. by extrusion) and by providing resistance to the flow of the rubber within a rubber mold for shaping and curing the rubber composition such as, for example, in the manufacturing of a rubber tire.

It is seen that for Experimental rubber Sample I the torque remained stable and did not significantly rise for the first 4 minutes of mixing. This delayed effect in considered herein to be important for reducing the Mooney viscosity buildup of the rubber composition to thereby promote better and more efficient processing within the internal rubber mixer.

It can also be seen that Experimental rubber Sample I has a faster rate of torque increase after the aforesaid 4 minute period of mixing. This is an indication that faster (shorter) rubber molding times are possible for manufacturing rubber articles.

EXAMPLE V

Rubber reinforcing effects of allyl treated precipitated silica and allyl treated silica gel is evaluated.

The precipitated silica is identified herein as Silica P and the allyl treated precipitated silica is identified herein as Silica A-P.

The silica gel is identified herein as Silica G and the allyl treated silica gel is identified herein as Silica A-G.

For this Example, the precipitated silica used was Zeosil 1165 MP™ from Rhodia.

For this Example, the silica gel used was SiliaBond™ from the Silicycle company.

The following Table D represents the general rubber formulation. The parts and percentages are by weight unless otherwise indicated.

TABLE D

|  | Parts |
|---|---|
| Non-Productive Mix Stage (NP) | |
| Cis 1,4-polybutadiene rubber[7] | 30 |
| Solution polymerization prepared styrene/butadiene rubber (S-SBR)[8] | 70 |
| Naphthenic rubber processing oil | 11 |
| Wax (microcrystalline) | 1 |
| Fatty acid2 | 2 |
| Coupling agent3 | 0 and 5.2 |
| Carbon black4 | 5.2 |
| Silica Z (untreated precipitated silica)6 | 0 and 65 |
| Silica A-P (allyl treated precipitated silica) | 0 and 65 |
| Silica A-G (allyl treated silica gel) | 0 and 65 |
| Productive Mix Stage (PR) | |
| Sulfur | 1.5 and 2 |
| Sulfenamide sulfur cure accelerator | 1.6 |
| Zinc oxide | 1 |
| Antioxidant, amine based | 0.5 |
| Diphenylguanidine secondary sulfur cure accelerator | 0.75 and 1.5 |

[7]Cis 1,4-polybutadiene rubber as Budene™ 1207 from The Goodyear Tire & Rubber Company
[8]Solution polymerization prepared SBR as Solflex™ 16S42 from The Goodyear Tire & Rubber Company Rubber samples N, O, and P were prepared in the manner of Example I. The cure behavior and physical properties of the respective Samples are shown in the following Table 4. For the cured rubber Samples, the Samples were cured for about 30 minutes at a temperature of about 150° C.

The rubber Samples are identified as Control rubber Sample N (with a precipitated silica reinforcement), Experimental rubber Sample O (with an allyl treated precipitated silica A-P) and Experimental rubber Sample P (with an allyl treated silica gel A-G).

TABLE 4

|  | Control Sample | Experimental Samples | |
|---|---|---|---|
|  | N | O | P |
| Materials (phr) | | | |
| Cis 1,4-polybutadiene rubber | 30 | 30 | 30 |
| S-SBR | 70 | 70 | 70 |
| Coupling agent | 5.2 | 0 | 0 |
| Silica Z—(precipitated silica) | 65 | 0 | 0 |
| Silica A-P (allyl treated precipitated silica) | 0 | 65 | 0 |
| Silica A-G (allyl treated silica gel) | 0 | 0 | 65 |
| Test Properties | | | |
| MDR, 150° C., 60 minutes | | | |
| Maximum torque less Minimum torque (dNm) | 17.8 | 18.2 | 5.2 |
| Scorch time TS1 (minutes) | 0.6 | 11.4 | 10 |
| Scorch time TS2 (minutes) | 4.8 | 12.2 | 14.1 |
| ATS, stress-strain (cured 30 min. at 150° C.) | | | |
| 100% ring modulus (MPa) | 2.5 | 2.7 | 0.8 |
| 300% ring modulus (MPa) | 9.6 | 8.8 | 1.7 |
| Tensile strength (break strength), (MPa) | 16.3 | 15.9 | 2 |
| Elongation at break (%) | 447 | 475 | 441 |
| Energy to achieve 300% strain (Joules) | 5.0 | 4.6 | 1.1 |
| RPA (150° C. cure cycle, 11 Hz, 10% strain, 100° C.) | | | |
| Storage modulus (G'), (MPa) | 1909 | 1949 | 670 |
| Tan delta | 0.13 | 0.13 | 0.30 |

It can be seen from Table 4 that rubber sample O containing Silica A-P (the allyl treated precipitated silica) had cured rubber stress-strain physical properties such as tensile strength, modulus and elongation as well as dynamic physical properties (RPA determined) such as storage modulus (G') and tan delta similar to rubber Sample N containing precipitated silica (which had not been allyl treated) together with a traditional silica coupling agent.

This is particularly significant in a sense that the precipitated silica (non allyl treated precipitated silica) needed the silica coupling agent to achieve cured rubber properties similar to the allyl treated precipitated silica without an inclusion of the silica coupling agent.

It is believed that this observation is truly remarkable and a significant departure from past practice.

Further, such overall rubber properties of rubber Sample N are dramatically and significantly better than the overall rubber properties of rubber Sample O (using the allyl treated silica gel), including the significantly reduced energy to achieve a 300 percent strain.

This is particularly significant in a sense that it was only the allyl treated precipitated silica (rubber reinforcement quality silica) which was observed to also achieve the beneficial cured rubber properties instead of the allyl treated silica gel.

These significant physical differences are considered herein to be a clear indication that the allyl treated precipitated silica (Silica A through P) has a significantly greater rubber reinforcing ability than the allyl treated silica gel (Silica A through G).

Further, it is seen that treating the silica gel with the allyl silane was not sufficient to enable the silica gel to become suitable for reinforcement of the rubber.

Accordingly, it is apparent that the silica structure is significant, particularly the combination, for the precipitated silica, of the BET nitrogen surface area, the CTAB surface area and a BET/CTAB ratio in a range of from 0.8 to 1.3.

Accordingly, it is considered herein that a combination of the specified precipitated silica structure and its allyl treatment is a significant aspect of this invention for providing rubber reinforcement.

While certain representative embodiments and details have been shown for the purpose of illustrating the invention, it will be apparent to those skilled in this art that various changes and modifications may be made therein without departing from the spirit or scope of the invention.

What is claimed is:

1. An allyl functionalized precipitated silica comprised of a precipitated silica containing at least one allyl group substituent;
wherein said allyl functionalized precipitated silica is represented by a general formula (I):

(I)

where Z represents the precipitated silica; $R^2$ and $R^3$ are the same or different radicals comprised of an alkyl group containing from 1 to 4 carbon atoms, a cycloalkyl group, a phenyl group, and alkene group containing from 3 to 18 carbon atoms or cycloalkene radical having from 5 to 8 carbon atoms;
and $R^1$ is an allyl hydrogen containing radical where a is an integer in a range of from 0 to 2, b is an integer in a range of from 0 to 2 and c is an inter in a range of from 1 to 3.

2. The allyl functionalized precipitated silica of claim 1 wherein at least one of $R^2$ and $R^3$ is comprised of at least one of hydroxyl groups and siloxy groups.

3. The allyl functionalized precipitated silica of claim 1 wherein number of Z—O—units ranges from 1 to 3.

4. The allyl functionalized precipitated silica of claim 1 wherein said $R^2$ and $R^3$ are the same or different radicals comprised of an alkyl group containing from 1 to 4 carbon atoms.

5. The allyl functionalized precipitated silica of claim 1 wherein $R^1$ is an allyl hydrogen containing radical represented as —$CH_2$—$CH$=$CH_2$.

6. The allyl functionalized precipitated silica of claim 1 wherein $R^1$ is an allyl hydrogen containing radical represented as —$CH_2$—$CH$=$CH$—$CH_3$.

7. The allyl functionalized precipitated silica of claim 1 wherein $R^1$ is an allyl hydrogen containing radical represented as —$CH_2$—$CH$=$C$—$(CH_3)_2$.

8. The allyl functionalized precipitated silica of claim 1 wherein $R^1$ is an allyl hydrogen containing radical represented as —$CH_2$—$C(CH_3)$=$CH$—$CH_3$.

* * * * *